(12) United States Patent
Doyle et al.

(10) Patent No.: US 11,294,661 B2
(45) Date of Patent: Apr. 5, 2022

(54) UPDATING A CODE FILE (71) Applicant: Microsoft Technology Licensing, LLC, Redmond, WA (US)

(72) Inventors: Darren Doyle, Carlow (IE); Terry Farrell, Dublin (IE); Thomas Doyle, Bray (IE)

(73) Assignee: Microsoft Technology Licensing, LLC, Redmond, WA (US)

(*) Notice: Subject to any disclaimer, the term of this patent is extended or adjusted under 35 U.S.C. 154(b) by 605 days.

(21) Appl. No.: 15/496,813

(22) Filed: Apr. 25, 2017

(65) Prior Publication Data
US 2018/0307480 A1 Oct. 25, 2018

(51) Int. Cl.
*G06F 8/658* (2018.01)

(52) U.S. Cl.
CPC .................. *G06F 8/658* (2018.02)

(58) Field of Classification Search
CPC .................. G06F 8/658; G06F 8/68
USPC ........................................ 717/169
See application file for complete search history.

(56) References Cited

U.S. PATENT DOCUMENTS

| 7,620,948 B1* | 11/2009 | Rowe ................ G06F 8/65 717/171 |
| 7,689,981 B1* | 3/2010 | Gustafson .......... G06F 11/1004 717/168 |
| 7,778,983 B2* | 8/2010 | Jorden ................ G06F 8/70 717/169 |
| 8,146,109 B2 | 3/2012 | Shneerson et al. |
| 8,527,814 B1* | 9/2013 | Elwell ................ G06F 11/0793 717/127 |
| 8,701,084 B1 | 4/2014 | MacDonald |
| 8,813,032 B2 | 8/2014 | Graf et al. |
| 8,997,046 B1* | 3/2015 | McFarlane ............ G06F 8/75 717/122 |
| 9,032,387 B1* | 5/2015 | Hill ..................... G06F 8/61 717/173 |
| 9,146,712 B2 | 9/2015 | Balachandran |
| 9,256,419 B2 | 2/2016 | Mannarswamy et al. |
| 2003/0212992 A1* | 11/2003 | Ronning ............... G06F 8/65 717/178 |

(Continued)

OTHER PUBLICATIONS

Kholmatov et al., "Identity authentication using improved online signature verification method", 2005, Elsevier (Year: 2005).*

(Continued)

*Primary Examiner* — Wei Y Zhen
*Assistant Examiner* — Junchun Wu
(74) *Attorney, Agent, or Firm* — Michael Best & Friedrich LLP (57) ABSTRACT

Methods and systems for updating a file using heuristics. One system includes an electronic processor configured to identify a code file stored on a storage device and determine a signature of the code file. The electronic processor is also configured to compare the signature of the code file to each of a plurality of signatures to determine a degree of similarity between the signature of the code file and each of the plurality of signatures, wherein each of the plurality of signatures is associated with a code update, and, in response to the degree of similarity between the signature of the code file and one of the plurality of signatures satisfying a predetermined threshold, apply the code update associated with the one of the plurality of signatures to the code file.

17 Claims, 4 Drawing Sheets

(56) References Cited

U.S. PATENT DOCUMENTS

| | | | |
|---|---|---|---|
| 2004/0088293 A1 | 5/2004 | Daggett | |
| 2004/0158818 A1* | 8/2004 | Smith | G06F 11/3612 717/127 |
| 2005/0055686 A1 | 3/2005 | Buban et al. | |
| 2005/0102669 A1* | 5/2005 | Marney | H04L 1/0041 717/174 |
| 2005/0144611 A1* | 6/2005 | Chen | G06F 11/1433 717/168 |
| 2005/0144616 A1* | 6/2005 | Hammond | G06F 8/65 717/173 |
| 2005/0149923 A1* | 7/2005 | Lee | G06F 8/65 717/172 |
| 2005/0154557 A1* | 7/2005 | Ebert | G06F 11/3428 717/176 |
| 2006/0265700 A1* | 11/2006 | Alur | G06F 8/75 717/141 |
| 2007/0168946 A1* | 7/2007 | Drissi | G06F 8/36 717/110 |
| 2007/0169067 A1* | 7/2007 | Kim | G06F 9/44589 717/163 |
| 2007/0169073 A1* | 7/2007 | O'Neill | G06F 8/61 717/168 |
| 2007/0245333 A1* | 10/2007 | Ferlitsch | G06F 8/65 717/168 |
| 2008/0072217 A1* | 3/2008 | Li | G06F 8/71 717/170 |
| 2009/0019005 A1 | 1/2009 | Hu et al. | |
| 2009/0037869 A1* | 2/2009 | Hamilton | G06Q 10/00 717/100 |
| 2009/0113409 A1* | 4/2009 | Zimmer | G06F 16/951 717/168 |
| 2009/0178033 A1* | 7/2009 | Challener | G06F 9/4411 717/168 |
| 2009/0235242 A1* | 9/2009 | Kawaguchi | G06F 3/123 717/168 |
| 2010/0107150 A1* | 4/2010 | Kamada | G06F 8/65 717/170 |
| 2011/0010690 A1* | 1/2011 | Howard | G06F 8/456 717/120 |
| 2012/0047498 A1* | 2/2012 | Motta | G06F 8/65 717/171 |
| 2012/0054727 A1* | 3/2012 | Joukov | G06F 9/44505 717/168 |
| 2012/0174087 A1* | 7/2012 | Bentzien | G06F 8/65 717/169 |
| 2013/0031538 A1* | 1/2013 | Skalsky | G06F 21/572 717/168 |
| 2013/0159985 A1* | 6/2013 | Gilman | G06F 8/65 717/168 |
| 2014/0047428 A1* | 2/2014 | Prakash | G06F 8/65 717/168 |
| 2014/0082596 A1* | 3/2014 | Judelman | G06F 9/449 717/130 |
| 2014/0282358 A1 | 9/2014 | Mowatt et al. | |
| 2014/0282490 A1* | 9/2014 | Shinomiya | G06F 8/61 717/174 |
| 2015/0007169 A1* | 1/2015 | Li | H04L 67/10 717/177 |
| 2015/0113520 A1* | 4/2015 | Kotani | G06F 8/65 717/172 |
| 2015/0363185 A1* | 12/2015 | Garratt | G06F 8/61 717/168 |

OTHER PUBLICATIONS

Dhodapkar et al., "Managing Multi-Configuration Hardware via Dynamic Working Set Analysis", 2002, IEEE (Year: 2002).*

Reis et al., "SWIFT: Software Implemented Fault Tolerance", 2005, IEEE (Year: 2005).*

Boldyreva, "Threshold Signatures, Multisignatures and Blind Signatures Based on the Gap-Diffie-Hellman-Group Signature Scheme ", 2003, Springer-Verlag Berlin Heidelberg, pp. 31-46 (Year: 2003).*

Fowler, Adam, "Excel and Word Macros Broken with Windows Update", https://www.adamfowlerit.com/2014/12/excel-macros-broken-with-windows-update/, Published on: Dec. 12, 2014, 6 pages.

* cited by examiner

UPDATING A CODE FILE

FIELD

Embodiments described herein relate to updating a code file, and, more particularly, to updating a code file based on updates made to other, similar code files using heuristics. For example, a learned and known update made to a code file that caused the code file to work properly (or better) may be used to update a similar code file.

SUMMARY

Many software products allow end users to create code files (for example, macros) that drive additional functionality within a software product. For example, an end user may generate a code file for simplifying one or more tasks, automatically performing a repetitive task, and the like. However, when the software product is updated (as frequently as daily in some situations), such as to a new version, there is a risk that an existing code file will not function properly after the update, which impacts the end user's productivity and may causes errors or other issues. In an enterprise with many thousands of files, manually identifying and updating these code files is a complex and time-consuming process because it may not be easy to identify what, if any, code files need updating. Similarly, when an updated software product is deployed, the impact of the update on existing code files is often unknown, which makes it difficult to determine whether or when to deploy such an update. Furthermore, separate from updates relating to software product updates, end users may benefit from updates made by other end users. For example, when one end user updates a code file that improves the performance of the code file (execution time is reduced, memory usage is reduced, accuracy is improved, or the like), another end user using a similar code file may similarly benefit from the same update but may not be aware of the existence of the update even when the end users are within the same organization.

Accordingly, embodiments described herein provide systems and methods for updating code files. For example, embodiments described herein collect updates to existing code files and automatically determine other existing code files that may benefit from the same updates using pattern matching and machine learning. The updates may be collected from users included in a common organization, such as an enterprise, or may be collected from unrelated users as crowd-sourced information. Alternatively or in addition, the updates (for a given pattern of code) may be defined by a developer of the software product. When an existing code file is identified that may benefit from a collected update, the code file may be automatically updated (without or after manual review and approval).

For example, one embodiment of the invention provides a system for updating a code file. The system includes an electronic processor configured to identify the code file stored on a storage device and a signature of the code file. The electronic processor is also configured to compare the signature of the code file to each of a plurality of signatures to determine a degree of similarity between the signature of the code file and each of the plurality of signatures, wherein each of the plurality of signatures is associated with a code update. In addition, the electronic processor is configured to, in response to the degree of similarity between the signature of the code file and one of the plurality of signatures satisfying a predetermined threshold, apply the code update associated with the one of the plurality of signatures to the code file.

Another embodiment provides method a method of updating a code file. The method includes receiving a plurality of file updates and a plurality of signatures from at least one user device, wherein each of the plurality of file updates is associated with at least one of the plurality of signatures. The method also includes identifying a file stored on a storage device and determining a signature of the file. In addition, the method includes comparing the signature of the file to each of the plurality of signatures to determine a degree of similarity between the signature of the file and each of the plurality of signatures, and, in response to the degree of similarity between the signature of the file and one of the plurality of signatures satisfying a first predetermined threshold, determining a confidence score of one of the plurality of updates associated with the one of the plurality of signatures. The method further includes, in response to the confidence score satisfying a second predetermined threshold, automatically, with an electronic processor, applying the one of the plurality of updates associated with the one of the plurality of signatures to the file.

Yet another embodiment provides a non-transitory, computer-readable medium including instructions that, when executed by an electronic processor, cause the electronic processor to execute a set of functions. The set of functions includes scanning at least one storage device to identify a plurality of code files and determining a type of update for each of the plurality of code files based on a signature of each of the plurality of code files, wherein the type of update includes at least one selected from a group consisting of an automatic update, an automatic update with manual review, and a manual update. The set of functions also includes determining a confidence score for each of the plurality of code files where the type of the update includes an automatic update. In addition, the set of functions includes generating a user interface, wherein the user interface lists the plurality of code files, the type of update for each of the plurality of code files, and the confidence score for each of the plurality of code files where the type of the update includes an automatic update, and displaying the user interface on a user device.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory, computer readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

As described above, when a software product is updated, such as to a new version, existing code files, such as macros, may be incompatible with the updated software product. These compatibility issues are difficult to identify or understand prior to deploying updates and are time-consuming to detect and correct after deploying updates (especially given the prevalence and complexity of software products and the frequency of updates to such software products). For example, after deploying an update, many users may be surprised when an existing code file no longer executes properly (for example, generates an error or performs an unexpected or improper function) and may spend considerable time and effort determining why the code file is not working and updating the code file to return the code file to a working state. Also, even when an end user has advance knowledge of a software product update, the end user may still spend considerable time and effort correcting his or her code files, which clearly impacts the end user's productivity and satisfaction with the software product. Accordingly, embodiments described herein automatically identify code files that may need updates after an update to a software product based on updates collected from one or more sources (other users within an organization or outside of an organization). The identified code files may be updated automatically or may be flagged for manual updating. Feedback received for updated code files may also be used to automatically learn the proper updates for particular categories of code files. The embodiments described herein may also provide insight before a software update is deployed regarding the impact of the update on existing code files and what actions may be taken to prepare these existing code files for the update to reduce or eliminate errors or problems after the update is deployed. For example, a confidence or risk score indicating the likelihood that an update will be successful may be provided as insight. The embodiments described herein may update a code file based on updates made to other, similar code files using heuristics. For example, a learned and known update made to a code file that caused the code file to work properly (or better) may be used to update another similar code file.

Figure 1:
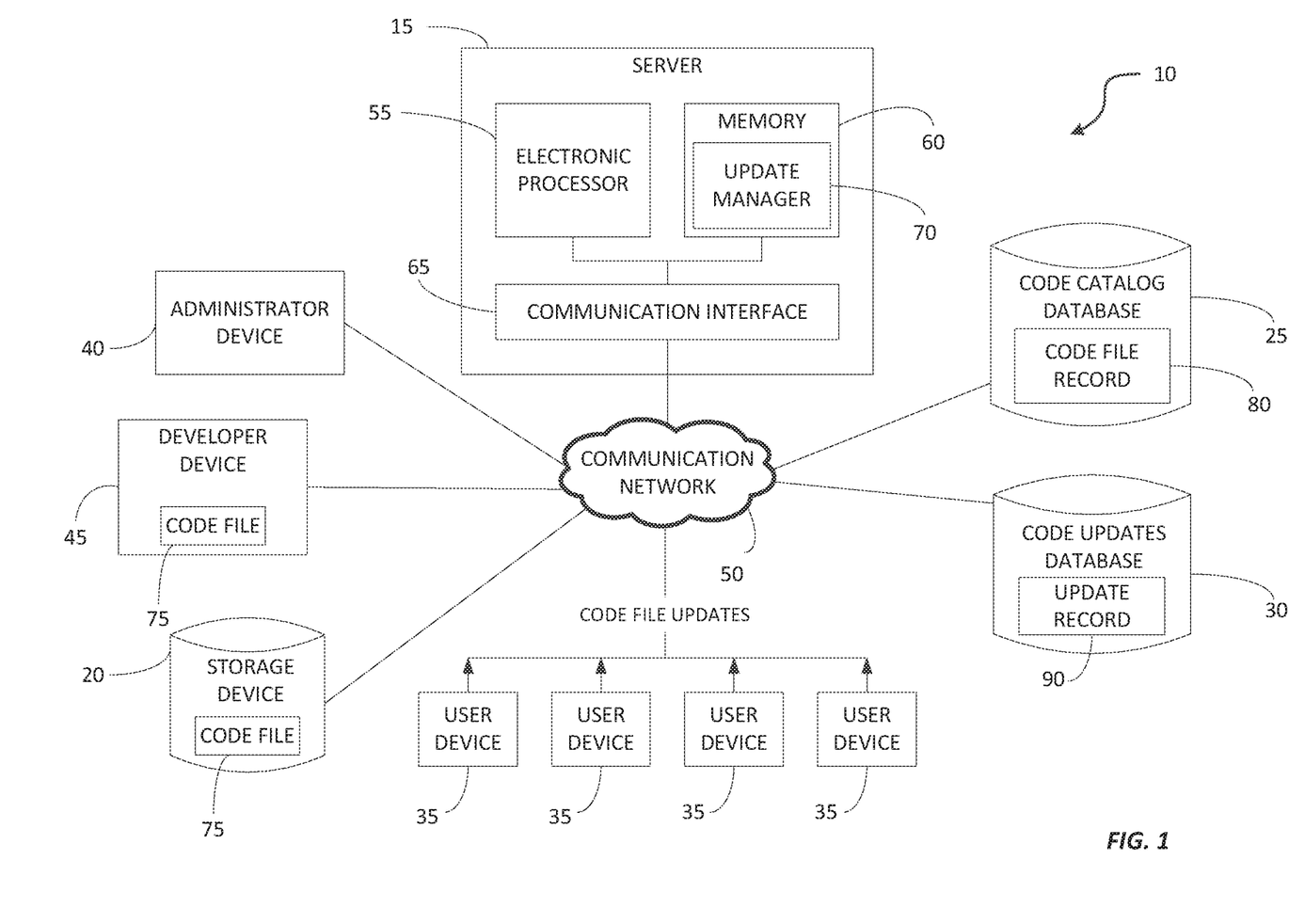
FIG. 1 schematically illustrates a system for updating a code file according to some embodiments.

For example, FIG. 1 schematically illustrates a system 10 for updating a code file according to some embodiments. The system 10 includes a server 15, a storage device 20, a code catalog database 25, a code updates database 30, one or more user devices 35 (referred to herein collectively as "the user devices 35" and individually as "a user device 35"), an administrator device 40, and a developer device 45. It should be understood that the system 10 may include fewer, additional, or different components than those illustrated in FIG. 1 in various configurations and may perform additional functionality than the functionality described herein. For example, four user devices 35 are illustrated in FIG. 1 as one example but more or less user devices 35 may communicate with the server 15 in various embodiments. Also, in some embodiments, the code catalog database 25, the code updates database 30, or both may be included in the server 15 and one or both of these databases may be distributed among multiple databases or storage devices. For example, in some embodiments, the server 15 may communicate with a first code updates database 30 storing updates made to code files within a particular organization and may also communicate with a second code updates database 30 storing updates made to code files external to a particular organization (for example, for privacy or security purposes). Also, it should be understood that, in some embodiments, multiple servers 15 may access the same code updates database 30 to provide automatic code file updates as described herein for different organizations. Accordingly, the code updates database 30 may be shared by multiple organizations. As used in the present application, an organization includes a group of related users, which may be employees, subscribers, committee members, students, and the like.

The server 15, the storage device 20, the code catalog database 25, the code updates database 30, the user devices 35, the administrator device 40, and the developer device 45 communicate over one or more wired or wireless communication networks 50. Portions of the communication networks 50 may be implemented using a wide area network, such as the Internet, a local area network, such as Bluetooth™ network or Wi-Fi, and combinations or derivatives thereof. It should be understood that in some embodiments, additional communication networks may be used to allow one or more components of the system 10 to communicate. Also, in some embodiments, components of the system 10 may communicate directly as compared to through a communication network 50 and, in some embodiments, the components of the system 10 may communicate through one or more intermediary devices not shown in FIG. 1.

As illustrated in FIG. 1, the server 15 includes an electronic processor 55 (for example, a microprocessor, an application-specific integrated circuit (ASIC), or another suitable electronic device), a memory 60 (for example, a non-transitory, computer-readable medium), and a communication interface 65, such as a transceiver that communicates with the administrator device 40, the developer device 45, the user devices 35, the code catalog database 25, the code updates database 30, the storage device 20, or a combination thereof over the communication networks 50 and, optionally, one or more other communication networks or connections. The electronic processor 55, the memory 60, and the communication interface 65 communicate wirelessly, over one or more communication lines or buses, or a combination thereof. It should be understood that the server 15 may include additional components than those illustrated in FIG. 1 in various configurations and may perform additional functionality than the functionality described herein. For example, in some embodiments, the functionality described herein as being performed by the server 15 may be distributed among servers or devices (including as part of services offered through a cloud service), may be performed by the administrator device 40, the developer device 45, one or more user devices 35, or a combination thereof.

The electronic processor 55 included in the server 15 is configured to retrieve instructions and data from the memory 60 and execute, among other things, the instructions to perform a set of functions including the methods described herein. For example, as illustrated in FIG. 1, the memory 60 includes an update manager 70. The update manager 70 is a software application executable by the electronic processor 55. As described in more detail below, the update manager 70, when executed by the electronic processor 55, updates code files. In one embodiment, a code file includes one or more instructions executable by an electronic processor (for example, after compiling) to perform particular functionality. In some embodiments, the instructions included in a code file include a macro that represents a larger set of instructions. In other embodiments, the instructions included in a code file include rules or configuration settings, such as electronic mail rules (if electronic mail sender is "xx," then move the electronic mail to folder "yy"), conditional formatting rules (if value is "xx," then color is "yy"), and the like. In some embodiments, the instructions included in a code file include instructions in human-readable form (source code) manually-generated by a user. However, in other embodiments, the instructions included in a code file include automatically-generated instructions in machine-readable form or human-readable form. The code files updated by the update manager 70 may include codes files stored on the server 15 (in the memory 60) or code files stored on external storage devices, such as code files 75 stored in the storage device 20, code files 75 stored on the developer device 45, and the like. It should be understood that the functionality described herein as being performed by the update manager 70 may be distributed among multiple software applications. Furthermore, the update manager 70 may perform additional functionality than the functionality described herein.

The user devices 35, the administrator device 40, and the developer device 45 may include one or more desktop computers, laptop computers, tablet computers, terminals, smart telephones, smart televisions, smart wearables, servers, databases, other types of computing devices, or a combination thereof. Although not illustrated in FIG. 1, the user devices 35, the administrator device 40, and the developer device 45 may include similar components as the server 15, such as an electronic processor, a memory, and a communication interface. The user devices 35, the administrator device 40, and the developer device 45 may also include one or more input devices (keyboard, keypad, mouse, joystick, touchscreen, and the like) and one or more output devices (display device, touchscreen, printer, speaker, and the like) that receive input from a user and provide output to a user.

The administrator device 40 may be used by an administrator tasked with deploying updates for one or more software products for one or more organizations. The software product may be used by one or more developer devices 45, which are used by end users included in the one or more organizations to access and use the software product and, optionally, create, edit, and use code files associated with the software product. As described in more detail below, the administrator device 40 may communicate with the server 15 to exchange information regarding software product updates, the impact of such updates on existing code files, code file updates, and the like. The exchanged information may be presented through one or more user interfaces displayed by the administrator device 40 to a user (through a display device included in the administrator device 40). It should be understood that, in some embodiments, the administrator device 40 executes a browser application to communicate with the server 15 (for example, to access user interfaces generated by the server 15 and exchange information with the server 15). In other embodiments, the administrator device 40 executes a software application specifically designed to communicate with the server 15. Also, it should be understood that, in some embodiments, the functionality performed by the server 15, or a portion thereof (including execution of the update manager 70), is performed by the administrator device 40.

As noted above, the developer device 45 may be used by an end user to create, edit, or use code files associated with a particular software product. For example, as illustrated in FIG. 1, the developer device 45 may store one or more code files 75. The code files 75 created by the end user through the developer device 45 may alternatively or in addition be stored to the storage device 20. For example, in some embodiments, code files may be shared among end users and, thus, may be stored to a storage device 20, such as a database or file directory, accessible by a plurality of developer devices 45.

As illustrated in FIG. 1, the user devices 35 are used by users to make updates to code files, which are transmitted to the server 15 via the communication network 50. In some embodiments, the user devices 35, or a subset thereof, are used by a plurality of users external to an organization associated with the administrator device 40 and the developer device 45. Accordingly, in some embodiments, the users of the user devices 35 provide crowd-sourced updates to code files. It should be understood that, in some embodiments, the developer device 45 is included in the user devices 35. For example, updates to code files 75 generated by an end user through the developer device 45 may be provided to the server 15 just as the user devices 35 provide code file updates. Accordingly, in some embodiments, the user devices 35 are optional as updates to code files as described herein may be collected from one or more developer devices 45 (for example, a set of developer devices 45 used by end users included in an organization). Also, in some embodiments, an administrator may use the administrator device 40 to submit updates for code files just as the user devices 35 provide code file updates.

The updates collected by the server 15 represent a code fix that addresses a particular issue with a code file. An update may include updated code, such as code manually updated by a user. In other embodiments, any update may include commentary describing an update to a code file. For example, in some situations, a user may email or post a code file or a portion thereof to another user with a request for assistance (for example, within a software developer forum) and one or more other users may comment on the code file with commentary on how to fix the code file. In some embodiments, the server 15 may determine an update by comparing a previous version of a code file with an updated code file. Alternatively, the server 15 may determine an update by tracking actions taken by a user (through telemetry or other logged data).

As described in more detail below, the server 15 receives the code files updates (for example, from the user devices 35, the administrator device 40, the developer device 45, or a combination thereof) and stores update records 90 based on the received updates to the code updates database 30. For example, the server 15 may store an update record 90 for each code file update that includes a description of the code file update (as updated code, a textual description, or the like) and a signature of the code file (before the update was made). The signature of the code file may include a hash or other unique identifier for the code file based on the content of the code file. The signature may represent the entire code file or a subsection of the code file. For example, when the update to the code file is associated with a particular subsection of the code file, the signature stored to the code updates database 30 may include a signature of the particular subsection. Accordingly, when an update is made to multiple subsections of a code file, the code updates database 30 may store an update record 90 (including a separate signature) for each update. The update records 90 stored in the code updates database 30 may store additional data, such as a date the update was implemented, an identifier of the software product associated with the code file (by name and optionally version), a performance metric for the code file, and the like. As noted above, in some embodiments, the server 15 stores update records 90 in two different code updates databases 30 depending on whether the update was received from within an organization or external to an organization. It should also be understood that in some embodiments two servers may be used wherein one server receives updates from within an organization and a separate server receives updates from sources external to an organization.

The server 15 uses the update records 90 stored to the code updates database 30 to automatically identify existing code files, such as the code files 75 stored on the developer device 45 and the storage device 20 needing an update. For example, as described in more detail below, the server 15 may determine a signature for the code files 75 stored on the developer device 45 and the storage device 20, compare the signatures to the update records 90 to determine updates made to code files with similar signatures, and update the code files 75 accordingly. In some embodiments, the server 15 may perform this functionality when a code file 75 is used (opened, edited, compiled, executed, and the like). Alternatively or in addition, the server 15 may scan the developer device 45, the storage device 20, or other storage locations to identify existing code files 75 and store a code file record 80 to the code catalog database 25 for each identified code file 75. Each code file record 80 (or subsection thereof) may include a signature as described above for the update records 90. Each code file record 80 may also include a storage location for the code file 75, such as an identifier of the device storing the code file, a file path and name for the code file 75, and the like. Similar to the update records 90, each code file record 80 may also store additional data, such as a date the code file 75 was created or lasted edited, a software product associated with the code file 75 (by name and optionally version), a performance metric for the code file 75, a pattern of application programming interface (API) usage, parts of an object model used by the code file 75, or the like. Accordingly, as described in more detail below, the server 15 may use the code catalog database 25 as a directory of existing code files 75. Thus, using the code file records 80 stored in the code catalog database, the server 15 may be configured to identify code files that need updating before an existing code file 75 is used and, optionally, before an update for a software product is deployed.

Figure 2:
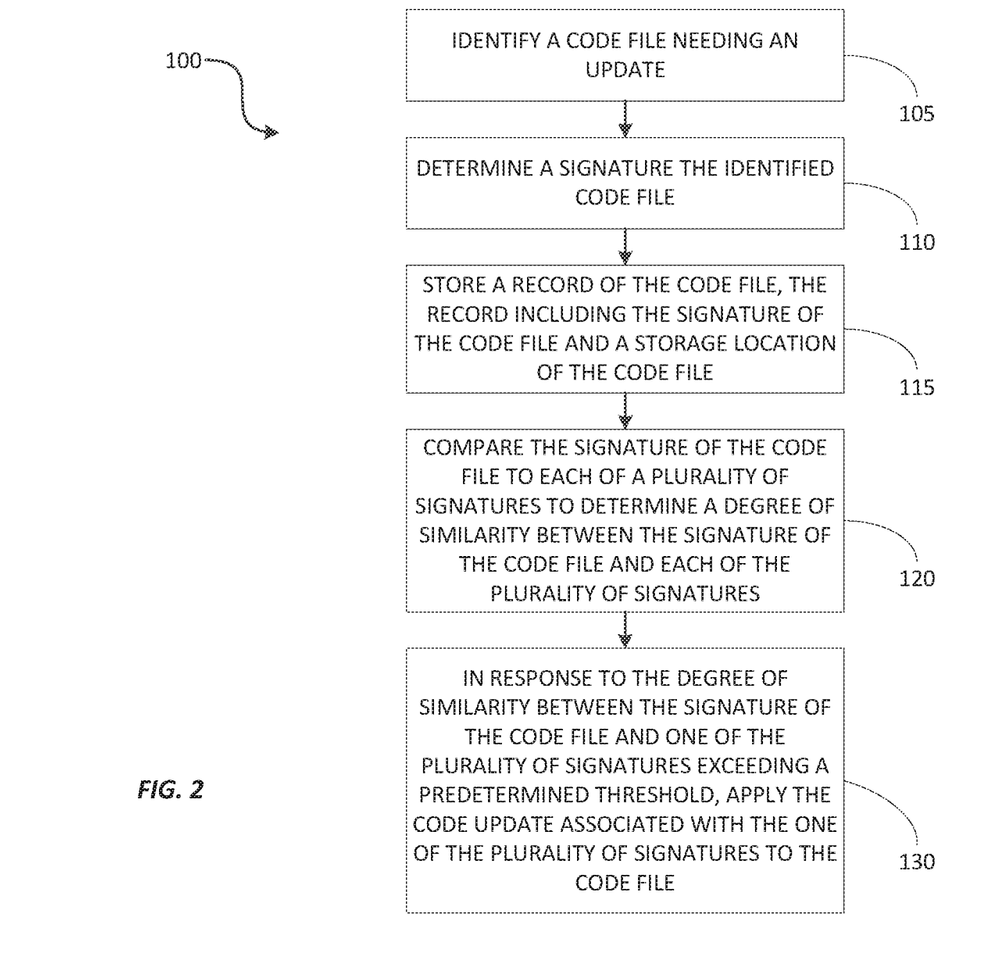
FIG. 2 is a flowchart illustrating a method of updating a code file performed by the system of FIG. 1 according to some embodiments.

For example, FIG. 2 is a flowchart illustrating a method 100 of updating a code file 75 according to some embodiments. The method 100 is described as being performed by the server 15 and, in particular, the electronic processor 55 through execution of the update manager 70. However, it should be understood that the method 100 may be performed in a distributed manner where portions of the method 100 may be performed by the administrator device 40, the developer device 45, or a combination thereof.

As illustrated in FIG. 2, the method 100 includes identifying an existing code file 75 potentially needing an update to make the code file 75 compatible with an updated version of a software product (at block 105). The code file 75 may be stored on a storage device, such as the developer device 45, the storage device 20, or the like. The update manager 70 may identify such an existing code file 75 in response to the occurrence of one or more triggering events. For example, the update manager 70 may identify existing code files 75 in response to the use (opening, editing, compiling, or execution) of a code file 75, the generation of an error during execution or compiling of a code file 75, the creation and storage of a new code file 75, or a combination thereof. Alternatively or in addition, the update manager 70 may identify the code file 75 in response to a user request. For example, the update manager 70 may receive a request from the administrator device 40 or the developer device 45 that a particular code file 75 be updated as needed (for example, by identifying a code file 75 experiencing errors). Similarly, the update manager 70 may receive a request from the administrator device 40 or the developer device 45 to scan for existing codes files 75 potentially needing fixes. In some embodiments, the user request is a one-time request. However, in other embodiments, the user request is a reoccurring request based on a predetermined schedule or frequency, such as daily, monthly, and the like. Similarly, the update manager 70 may be configured (separate from any user request) to automatically identify code files 75 on a predetermined schedule, such as daily, monthly, and the like. When performing a scan of one or more storage devices, the update manager 70 may identify existing code files 75 by identifying any stored code file 75, identifying code files 75 written in particular language or format, identifying code files 75 created or last edited after a predetermined date, identifying code files 75 not previously identified (based on the code file records 80 stored in the code catalog database 25), or the like. In some embodiments, the scanning for code files 75 by the update manager 70 is configurable (by an administrator via the administrator device 40) to manage how frequently a scan is performed and what code files 75 are identified. It should be understood that, in some embodiments, the update manager 70 may identify the code files 75 as described above but may not determine updates for identified code files 75, as described below, until a code file 75 is used (opened, edited, compiled, or executed).

In response to identifying a code file 75 potentially needing an update, the update manager 70 determines a signature for the code file 75 (at block 110). As noted above, the signature of the code file 75 may include a hash or other unique identifier for the code file based on the content of the code file. As noted above, a signature may represent an entire code file or a subsection of a code file. For example, in some embodiments, the update manager 70 may parse an identified code file 75 into multiple subsections and determine a signature for each subsection.

In some embodiments, the update manager 70 optionally stores a code file record 80 to the code catalog database 25 for each identified code file 75 (or subsection thereof) (at block 115). Each code file record 80 may include a signature that includes the signature as described above. The code file record 80 may include additional information, such as a storage location for the code file (device identifier, file name and path, and the like), a timestamp for the last execution, last edit, and the like. In some embodiments, when two code files have the same signature, an identifier (storage location) of each code file may be stored in the separate code file record 80 or in separate code file records 80. By storing a code file record 80 for each identified code file 75, the update manager 70 maintains an inventory of existing code files, updated code files, and the like. For example, when the update manager 70 is configured to identify code files 75 on a predetermined schedule or separate from the use of a particular code file 75, the update manager 70 may store code file records 80 such that the records can be subsequently compared to update records 90 (existing update records 90 and future update records 90). In particular, by keeping a current catalog of existing code files, when an update is subsequently planned, the update manager 70 can efficiently identify what existing code files may need updating. Similarly, by keeping a current catalog of existing code files, the update manager 70 may automatically apply subsequently received code file updates without having to re-scan or identify what code files (if any) may benefit from the received update. For example, in some embodiments, the update manager may set a flag for each code file 75 after the code file 75 is cataloged in the code catalog database 25, which may be reset only after the code file 75 is subsequently edited (by the update manager 70, a user, or both). Also, the code file record 80 stored to the code catalog database 25 may indicate whether a code file has already been updated, which may prevent the update manager 70 from wasting resources on code files that have already been updated (for a particular software product update).

As illustrated in FIG. 2, the update manager 70 compares the signature of the identified code file 75 (or a subsection thereof) to the signatures included in the update records 90 stored in the code updates database 30 to determine a degree of similarity between the signature of the identified code file 75 and each of the plurality of signatures (at block 120). In response to the degree of similarity between the signature of the code file 75 and one of the plurality of signatures satisfying (for example, equaling or exceeding) a predetermined threshold, the update manager 70 applies the code update associated with the one of the plurality of signatures to the code file 75 (at block 130). Accordingly, the update manager 70 uses pattern matching to detect similar code files and apply updates made to one code file to the other similar code files. In some embodiments, the predetermined threshold includes an identical match between signatures. However, in other embodiments, the predetermined threshold includes less than an identical match between signatures but identifies a similar category of instructions (for example, formatting instructions, printing instructions, and the like). For example, in some embodiments, the update manager 70 assigns a similarity weight to each signature included in the update records 90 representing a degree of similarity between the signature in the update records 90 and the signature of the identified code file 75. In these embodiments, the update manager 70 may select a subset of the signatures included in the update records 90 that satisfy the predetermined threshold (all weights satisfying the threshold, the top three weights, the top two weights, and the like). To identify which of the subset of signatures is associated with the preferred update for the identified code file 75, the update manager 70 may then verify each associated update (as described above) to identify the preferred update.

The update may be applied to the identified code file 75 in a variety of ways. For example, in some embodiments, the update manager 70 automatically applies an update by editing at least one instruction included in the identified code file 75 based on the update. In other embodiments, the update manager 70 automatically applies an update by a comment to the identified code file 75, the comment including at least one edited instruction based on the update. In these situations, an end user may manually uncomment the edited instruction to apply the fix to the code file 75. When automatically editing the content of the identified code file 75, the update manager 70 may use grammar style processing to identify an update, apply an update, or both. For example, the update manager 70 may determine variable names used in a code file, function names used in a code file, or the like using grammar style processing to apply edits in a consistent matter with the existing content in the code file 75. The update manager 70 may apply similar grammar style processing to interpret an update included in an update record 90 to identify how to apply a similar update to the identified code file 75.

Figure 3:
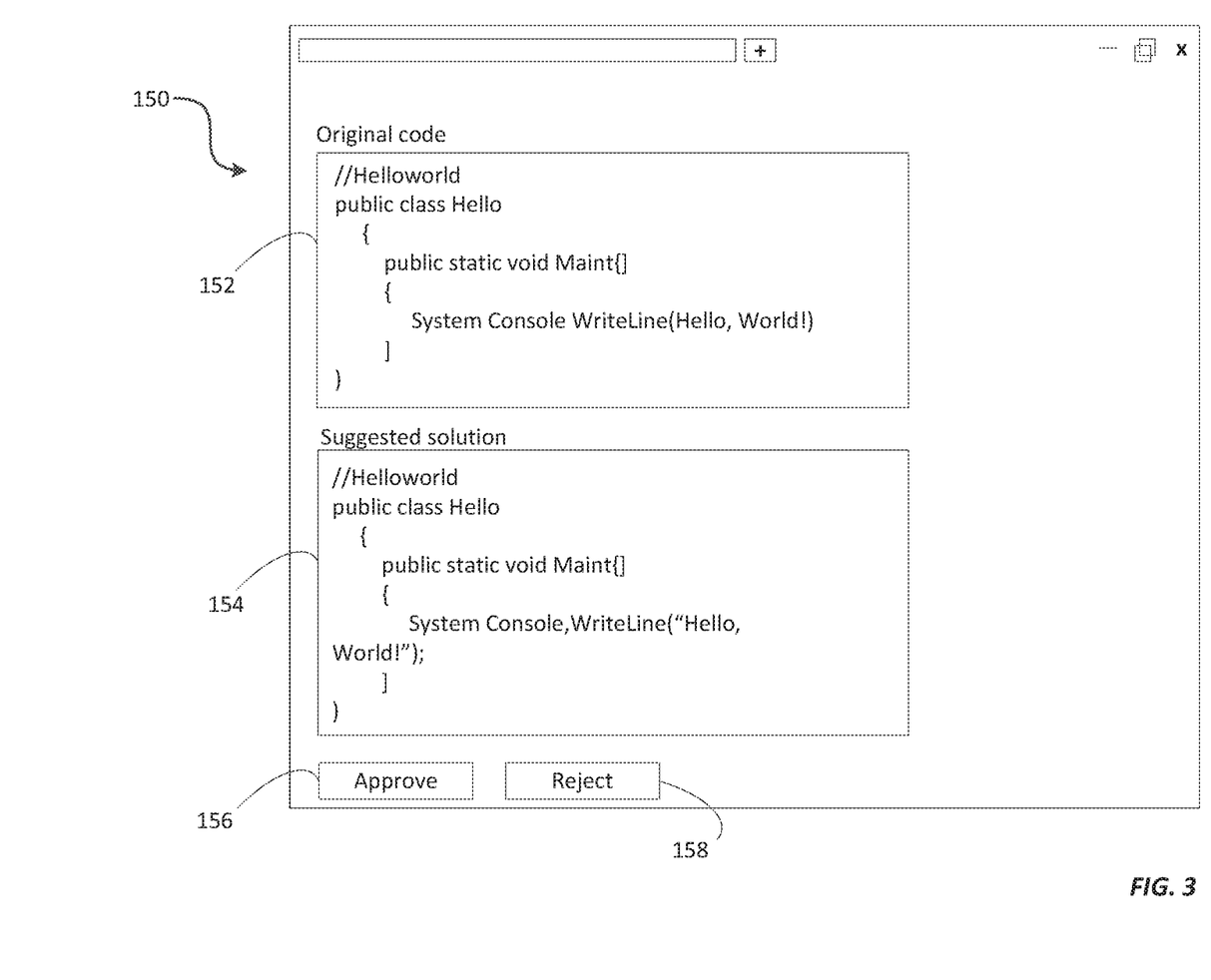
FIG. 3 illustrates a user interface for collecting a manual update to a code file according to some embodiments.

In some embodiments, before or after automatically editing the content of a code file 75 as described above, the update manager 70 may prompt a user to confirm the update. For example, the update manager 70 may transmit a notification to the administrator device 40, the developer device 45, or both in response to determining an update for a code file 75. The notification may inform a user of the update, display the actual update to the instructions included in the code file, and prompt the user to approve or reject the update (through selection of one or more selection mechanisms). For example, as illustrated in FIG. 3, the update manager 70 may prompt a user to approve or reject an update through a user interface 150. As illustrated in FIG. 3, the user interface 150 includes a first window 152 displaying the original content of the code file 75 and a second window 154 displaying updated content of the code file 75. The user may interact with the user interface 150 through one or more selection mechanisms, such as buttons. For example, to approve the update, the user may select an approve button 156 and, to reject the update, the user may select a reject button 158. In some embodiments, before selecting the approve button 156, the user may be able to edit the content included in the second window 154 to manually adjust the updated content before approving the update.

Similarly, in some embodiments, the update manager 70 may not automatically apply an update but may generate and transmit a warning to a user that a code file 75 may need an update and inform the user of the type of issues requiring the update. In these situations, the user may access the code file 75 to manually update the code file 75.

In some embodiments, the update manager 70 receives feedback for updates from users (before or after a manual or automatic update). The feedback may specify whether the update successfully addressed any compatibility errors, whether the update introduced other errors or issues, whether the update positively or negatively affected the performance of the code file 75, and the like. In some embodiments, the update manager 70 may prompt a user for feedback and allow the user to provide feedback through the selection of one or more selection mechanisms or free-form commentary. Alternatively or in addition, the update manager 70 may track user actions (through telemetry data or other logged data, such as an error log) to determine whether a user made manual updates in addition to any automatically-applied updates, whether any errors were encountered after a code file 75 was updated, and the like. The update manager 70 may automatically learn from this feedback to develop new updates and rules about applying updates to improve how updates are identified and applied. For example, when an update stored in the code updates database 30 introduces additional (and perhaps more critical) errors, the update manager 70 may modify an associated update record 90 (by setting a flag or a weight associated with the update record 90 or deleting the update record 90) accordingly to prevent or limit the update from being applied to other code files, to require manual review before or after making any such updates, or to modify the update record 90 such that a proper update is applied in the future. In some embodiments, the update manager 70 may also modify (flag) code files 75 that are updated to track what code files 75 have been updated, what code files 75 have been updated successfully, and the like. The update manager 70 may also use the feedback to add new update records 90 that may be used to apply future updates.

Similarly, in some embodiments, the update manager 70 automatically verifies code updates before or after an update is applied (automatically or manually). For example, the update manager 70 may verify an update by executing an original version of a code file 75 to generate an original set of results, executing an updated version of the code file 75 to generate an updated set of results, and comparing the original set of results with the updated set of results. In response to the original set of results differing from the updated set of results, the update manager 70 may modify the associated update record 90 (by setting a flag or a weight associated with the update record 90 or deleting the update record 90) accordingly to prevent or limit the update from being applied to other code files or require manual review before or after making any such updates. For example, each update record 90 may be associated with a confidence or risk score that may be set based on whether the update is verified. Thus, the confidence score indicates the likelihood that an automatic update will be successful. The update manager 70 may apply one or more rules (configurable by an administrator) to control whether or how an update associated with the update record 90 is applied to code files 75. For example, depending on the confidence score, the update manager 70 may not apply an update associated with the update record 90 to other code files 75 or may limit the update to particular situations, such as by requiring manual review of any such update or making updates only when the code file has (or lacks) particular characteristics or works with particular data, software applications, or devices. Also, in some embodiments, the update manager 70 may generate and transmit a warning to a user, such as an administrator using the administrator device 40, in response to an update having a low confidence score.

In some embodiments, the user interfaces, notifications, and warnings described above are provided to the end user who created (or last edited) the code file 75 being updated (through the developer device 45). Alternatively or in addition, the user interfaces, notifications, and warnings described above may be provided to an administrator (through the administrator device 40). For example, an information technology (IT) administrator for an organization may be responsible for managing code files created by members of the organization (employees) and may manage updates to code files. Also, in some embodiments, an administrator may be able to set the destination for such user interfaces, notifications, and warning (end-user, manager, administrator, and the like) through configuration of the update manager 70.

Figure 4:
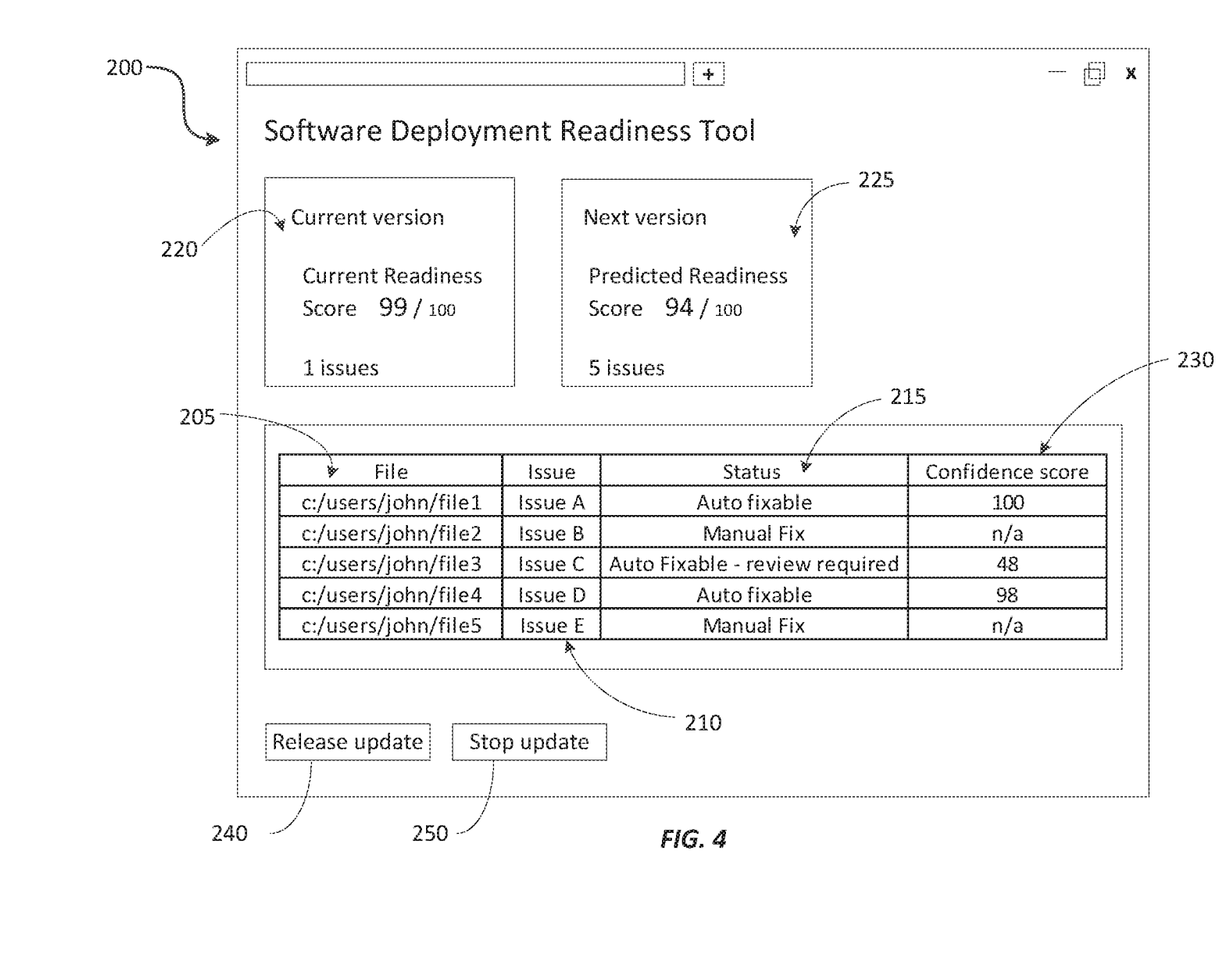
FIG. 4 illustrates a user interface generated by the system of FIG. 1 according to some embodiments for displaying deployment readiness metrics for an update to a software product.

Also, in some embodiments, the update manager 70 may provide the administrator device 40 with one or more user interfaces for managing updates to a set of code files. The user interfaces may be displayed on a display device of the administrator device 40. The user interfaces may provide an administrator with insight into the impact of an update to a software product on existing code file 75, such as a list or count of code files 75 (code files 75 needing updating), a list or count of code files 75 requiring manual updating, and the like. For example, FIG. 4 illustrates one example user interface 200. As illustrated in FIG. 4, the user interface 200 includes a list of code files 205. The list of code files 205 may include code files 75 identified by the update manager 70 as potentially needing updating, such as the result of a scan for existing code files as described above. In some embodiments, the list of code files 205 may only include those code files 205 that have not yet been flagged as being updated. The user interface 200 also includes a list of issues 210 that identifies one or more issues associated with each code file 75 included in the list of code files 205. In some embodiments, the issues included in the list of issues 210 may be issues (errors) that each code file 75 may experience when an end user attempts to execute each of the code files 75 after the software product update. In some embodiments, the user interface 200 also includes a list of status information 215 that identifies a status of each code file 75 (or each associated issue). The status information may indicate the type of update needed to each code file 75, such as whether the code file may be automatically fixed, automatically fixed after manual review, or requires manual fixing. The user interface 200 may also include a list of confidence scores that provides a confidence score for each code file 75 that may be automatically fixed. As described above, the confidence level may indicate the likelihood that a code file 75 can be automatically fixed and may be calculated by verifying the results of a code file 75 after an update. In some embodiments, however, the update manager 70 may calculate (or adjust) a confidence score using feedback received within an organization, outside of an organization, or the like to use machine learning to set confidence scores. In addition, in some embodiments, the update manager 70 may re-calculate confidence scores as new updates (update records 90) are received, as code files 75 are updated, as feedback is received for updates, and the like. Also, in some embodiments, a confidence score may also be manually adjusted, such as by an IT administrator or the developer of the software product update.

Although not illustrated in FIG. 4, in some embodiments, the update manager 70 also categorizes issues included in the list of issues 210, such as into severity levels. Each severity level may include the extent of the update needed for the code file 75 (a number of lines of code needing updating), a type of error associated with an update or existing prior to the update, an importance (or frequency of use) of the code file, and the like.

Using the user interface 200, an IT administrator may control what code files 75 are updated. For example, an IT administrator may select, through the user interface 200, whether an automatic update should be applied, may manually review such automatic updates when required, and may select a code file 75 from the list of code files 205 to manually update the code file 75. In some embodiments, the update manager 70 may also be configured to automatically take particular actions without requiring intervention from the IT administrator through the user interface 200, such as automatically apply updates when a confidence score satisfies a particular threshold, and the like. The IT administrator, however, may be able to review or track such automatic actions through the user interface 200 or other user interfaces.

In some embodiments, the user interface 200 also includes one or more readiness scores that inform a user, such as an IT administrator, of the estimated success of a particular software product update. For example, as illustrated in FIG. 4, the user interface 200 may include a current readiness score 220 and a predicted readiness score 225. The current readiness score 220 may be associated with the current version of a software product while the predicted readiness score 225 may be associated with an updated version of the software product. In some embodiments, the update manager 70 may calculate these readiness scores as a percentage of code files 75 needing updates to be compatible with the applicable version of the software product out of all existing code files 75. As illustrated in FIG. 4, the readiness scores may also be associated with a number of issues that may need to be addressed to reach a maximum readiness score (for example, 100). The user interface 200 may also include one or more selection mechanisms (for example, a release update button 240 and a stop update button 250) that allow the IT administrator to control when an update for a software product is deployed. Similarly, in some embodiments, the update manager 70 may be configured to automatically deploy or stop deployment of a software product update based on the readiness scores.

Accordingly, when an IT administrator needs to deploy a new software update, he or she may not have time to manually validate and test all existing code files 75 within an organization to ensure that the code files 75 will function after the update is deployed. Thus, the IT administrator can use the update manager 70 as described above to scan the organization's network to identify code files 75 and create a signature for each identified code file 75. The update manager 70 also processes the identified code files 75 to identify known issues that may cause compatibility issues with the upcoming update. The update manager 70 may identify these known issues based on insights gather via crowd-sourced data and machine learning, issues identified by developers within the organization, or issues identified by the provider of the software product update. These issues may be provided to the IT administrator through one or more user interfaces as described above and may identify a number of code files 75 impacted by the software product update, a confidence score that the code files 75 can be automatically updated, the code files 75 that will need manual updates, and similar information. All of this insight helps the IT administrator make an informed decision regarding whether or when the software product update should be deployed. For example, the IT administrator may control how much risk can be assumed for a particular code file (for example, based on the criticality of the code file) to allow automatic updating of the code file and whether any manual verification is required for the update. The IT administrator may also identify when to deploy the update for the software product depending on the number and criticality of the code files 75 that may be impacted by the updated. Such deployment may also be automatically controlled by the update manager 70 to deploy such an update when particular configurable rules are satisfied. Feedback for updates (automatic updates, manual updates, or both) is also collected and use to improve subsequent code file updates. This automatic functionality frees the IT administrator to focus on other tasks but keeps the IT administrator in control of critical code files or other risky updates.

It should be understood that the methods and systems described herein may be used separate from deploying updates to software products. For example, end users may use similar code files and enhancements made to one code file may be applicable to and beneficial to the other similar code files. In particular, when an end user updates a code file to improve the speed, reliability, or resource usage of the code file, a similar update may be applied to other similar code files as described above. In these situations, in addition to or as an alternative to calculating a confidence score, the update manager 70 as described above may determine a performance score representing an improvement in a performance metric (speed, accuracy, memory usage, and the like) associated with an update. The update manager 70 may provide the performance score to a user. For example, the update manager 70 may output a notification to a user that an updated version of a particular code file is available that allows the code file to run 33% faster. The update manager 70 may also prompt a user whether he or she wants to apply the update to a code file.

It should also be understood that the methods and systems described herein may be used to apply updates to content other than computer-executable instructions. For example, the systems and methods described herein may be used to apply edits to textual content within a data file to other similar data files, such as data files with common authors, relating to common subject matter, published in common publications, and the like. For example, by comparing the pre-edited document to the edited document, the systems described herein may use pattern matching to learn (for example, via machine learning) about the edits that a typical proof reader applies. The system may then use this knowledge to automatically proof read future documents. Such an implementation may be done on a global level or on local level tailored to a writing style of a specific user.

Thus, embodiments described herein provide, among other things, systems and methods for managing updates to code files based on updates made to other code files (by other users within an organization, outside of an organization, defined by IT personnel, or the like). Various features and advantages of some embodiments are set forth in the following claims.

What is claimed is:

1. A system for updating a code file, the system comprising:
   an electronic processor configured to
   identify the code file stored on a storage device,
   parse the code file into a plurality of subsections,
   determine a signature for each of the plurality of subsections, compare the signature for each of the plurality of subsections to each of a plurality of predetermined signatures to determine a degree of similarity between the signature for each of the plurality of subsections and each of the plurality of predetermined signatures, each of the plurality of predetermined signatures associated with a code update fixing a known issue with an associated code file, and in response to the degree of similarity between the signature for one of the plurality of subsections and one of the plurality of known signatures satisfying a predetermined threshold, apply the code update associated with the one of the plurality of known signatures to the one of the plurality of subsections included in the code file, wherein applying the code update includes adding a comment to the one of the plurality of subsections, the comment including at least one edited instruction based on the code update.

2. The system of claim 1, wherein the electronic processor is configured to identify the code file stored on the storage device in response to use of the code file.

3. The system of claim 1, wherein the electronic processor is configured to identify the code file stored on the storage device as part of a scan of the storage device on a predetermined frequency.

4. The system of claim 1, wherein the electronic processor is further configured to store a record of the code file, the record including the signature of the code file and a storage location of the code file.

5. The system of claim 1, wherein the electronic processor is configured to apply the code update associated with the one of the plurality of signatures to the code file by automatically editing at least one instruction included in the code file based on the code update.

6. The system of claim 1, wherein the electronic processor is configured to apply the code update associated with the one of the plurality of signatures to the code file by prompting a user to approve application of the code update to the code file and automatically applying the code update to the code file in response to receiving approval from the user.

7. A method of updating a file, the method comprising:
receiving a plurality of file updates and a plurality of signatures from at least one user device, each of the plurality of file updates associated with at least one of the plurality of signatures;
identifying a file stored on a storage device;
determining a signature of the file;
comparing the signature of the file to each of the plurality of signatures to determine a degree of similarity between the signature of the file and each of the plurality of signatures;
in response to the degree of similarity between the signature of the file and one of the plurality of signatures satisfying a first predetermined threshold, determining a confidence score of one of the plurality of updates associated with the one of the plurality of signatures, wherein the confidence score indicates a likelihood that the one of the plurality of updates will be successful; and
in response to the confidence score satisfying a second predetermined threshold, automatically, with an electronic processor, applying the one of the plurality of updates associated with the one of the plurality of signatures to the file, wherein applying the one of the plurality of updates includes adding a comment to the file, the comment including at least one edited instruction based on the code update.

8. The method of claim 7, further comprising receiving feedback after applying the one of the plurality of code updates to the file and automatically updating the confidence score based on the feedback.

9. The method of claim 8, wherein receiving the feedback includes receiving telemetry data tracking a manual edit to the file.

10. The method of claim 8, wherein receiving the feedback includes receiving an error log for the file.

11. The method of claim 7, further comprising verifying the one of the plurality of updates applied to the file by executing an original version of the file before applying the one of the plurality of updates to the file to generate an original set of results, executing an updated version of the file after applying the one of the plurality of updates to the file to generate an updated set of results, and comparing the original set of results and the updated set of results and automatically updating the confidence score based on the comparing of the original set of results and the updated set of results.

12. The method of claim 7, wherein receiving the plurality of file updates from at least one user device includes receiving a first subset of the plurality of file updates from a first set of user devices associated with an organization and receiving a second subset of the plurality of files updates from a second set of user devices outside of the organization.

13. The method of claim 7, wherein comparing the signature of the file to each of the plurality of signatures to determine a degree of similarity between the signature of the file and each of the plurality of signatures includes assigning a weight to each of the plurality of signatures, wherein the weight represents a degree of similarity between the signature of the file and each of the plurality of signatures, and further comprising identifying a subset of the plurality of signatures having a weight satisfying the first predetermined threshold.

14. A non-transitory, computer-readable medium including instructions that, when executed by an electronic processor, cause the electronic processor to execute a set of functions, the set of functions comprising:
scanning at least one storage device to identify a plurality of code files;
determining a type of update for each of the plurality of code files based on a signature of each of the plurality of code files, the type of update including at least one selected from a group consisting of an automatic update, an automatic update with manual review, and a manual update;
determining a confidence score for each of the plurality of code files where the type of the update includes an automatic update, wherein the confidence score indicates a likelihood that the type of update will be successful;
generating a user interface, the user interface listing the plurality of code files, the type of update for each of the plurality of code files, the confidence score for each of the plurality of code files where the type of the update includes an automatic update, and at least one selection mechanism for deploying a software product update;
displaying the user interface on a user device; and
in response to receiving input from a user through the at least one selection mechanism, deploying the software product update, wherein deploying the software product update includes updating one or more instructions included in each of the plurality of code files.

15. The non-transitory, computer-readable medium of claim 14, wherein the user interface further includes at least one readiness score for the plurality of code files, the readiness score specifying a percentage of the plurality of code files needing updating prior to deployment of a software product update.

16. The non-transitory, computer-readable medium of claim 14, wherein the set of functions further includes receiving input from a user through the user interface, wherein the input includes at least one selected from a group consisting of approval of an automatic update of one of the plurality of code files and selection of one of the plurality of code files for manual updating.

17. The non-transitory, computer-readable medium of claim 14, wherein the set of functions further includes receiving input from a user through the user interface, wherein the input includes adjustment of the confidence score for at least one of the plurality of code files.

* * * * *